United States Patent
Cormier et al.

(10) Patent No.: US 9,394,702 B2
(45) Date of Patent: Jul. 19, 2016

(54) SURFACE UNDERLAYMENT SYSTEM WITH INTERLOCKING RESILIENT ANTI-SLIP SHOCK TILES

(71) Applicant: VICONIC SPORTING LLC, Dearborn, MI (US)

(72) Inventors: Joel M. Cormier, Lathrup Village, MI (US); Donald S. Smith, Commerce, MI (US); Richard F. Audi, Dearborn, MI (US); Dane R. Winbigler, Harper Woods, MI (US)

(73) Assignee: VICONIC SPORTING LLC, Dearborn, MI (US)

( * ) Notice: Subject to any disclaimer, the term of this patent is extended or adjusted under 35 U.S.C. 154(b) by 0 days.

(21) Appl. No.: 14/533,438

(22) Filed: Nov. 5, 2014

(65) Prior Publication Data

US 2016/0123021 A1    May 5, 2016

(51) Int. Cl.
*E04F 15/22* (2006.01)
*E04F 15/02* (2006.01)
*B29C 45/14* (2006.01)
*B29C 51/02* (2006.01)
*B29L 31/10* (2006.01)
*B29L 31/00* (2006.01)

(52) U.S. Cl.
CPC .............. *E04F 15/225* (2013.01); *B29C 45/14* (2013.01); *B29C 51/02* (2013.01); *E04F 15/02177* (2013.01); *B29L 2031/10* (2013.01); *B29L 2031/7324* (2013.01); *E04F 2201/095* (2013.01); *E04F 2203/00* (2013.01); *E04F 2290/044* (2013.01)

(58) Field of Classification Search
CPC .............. E04F 15/225; E04F 15/02177; E04F 2201/095; E04F 2290/044; E04F 2203/00; B29C 45/14; B29C 51/02; B29L 2031/10; B29L 2031/7324

See application file for complete search history.

(56) References Cited

U.S. PATENT DOCUMENTS

| | | | | |
|---|---|---|---|---|
| 2,275,575 A | * | 3/1942 | Vrooman | A47G 27/0412 428/167 |
| 4,757,665 A | * | 7/1988 | Hardigg | B29C 45/26 52/782.1 |

(Continued)

FOREIGN PATENT DOCUMENTS

| EP | 2154291 A1 | 2/2010 |
|---|---|---|
| WO | 2013183989 A1 | 12/2013 |

OTHER PUBLICATIONS

International Search Report and Written Opinion; International application No. PCT/US2015/014570; date of mailing May 14, 2015.

*Primary Examiner* — Jeanette E Chapman
(74) *Attorney, Agent, or Firm* — Brooks Kushman P.C.

(57) ABSTRACT

A recoiling energy absorbing system is interpositioned between an outer shell that is exposed to percussive impact and a foundation. An energy absorbing layer with friction lugs is positioned inside the outer shell. The energy absorbing layer includes one or more energy absorbing modules with optional veins and drain holes. At least some of the modules are provided with one or more energy absorbing units that extend from an upper basal layer. At least some of the energy absorbing units are provided with a flexible wall that extends from the upper basal layer. The energy absorbing units at least partially absorb energy generated by an impacting object due to the flexible wall bending inwardly or outwardly and recoiling nondestructively after single or multiple impacts to its undeflected configuration.

16 Claims, 5 Drawing Sheets

(56) References Cited

U.S. PATENT DOCUMENTS

| | | | | |
|---|---|---|---|---|
| 5,030,501 | A * | 7/1991 | Colvin | B32B 3/12 206/522 |
| 5,383,314 | A | 1/1995 | Rothberg | |
| 5,399,406 | A * | 3/1995 | Matsuo | B32B 3/12 428/166 |
| 5,619,832 | A | 4/1997 | Myrvold | |
| 6,681,907 | B2 * | 1/2004 | Le | B60R 21/04 188/371 |
| 6,938,290 | B2 * | 9/2005 | McKinney | A47C 7/021 297/452.27 |
| 7,690,160 | B2 * | 4/2010 | Moller, Jr. | E04F 15/10 404/35 |
| 8,221,856 | B2 | 7/2012 | Stroppiana | |
| 8,568,840 | B2 | 10/2013 | Sawyer et al. | |
| 8,726,424 | B2 * | 5/2014 | Thomas | A42B 3/124 2/414 |
| 8,777,191 | B2 * | 7/2014 | Kligerman | F16F 1/373 188/371 |
| 8,919,069 | B2 * | 12/2014 | Bird | E04F 15/105 52/582.1 |
| 2002/0017805 | A1 | 2/2002 | Carroll, III et al. | |
| 2003/0154676 | A1 * | 8/2003 | Schwartz | A47G 27/0293 52/391 |
| 2005/0133324 | A1 | 6/2005 | Soto Bailon et al. | |
| 2014/0311074 | A1 | 10/2014 | Cormier et al. | |
| 2014/0311075 | A1 * | 10/2014 | Cormier | E04F 15/225 52/403.1 |

\* cited by examiner

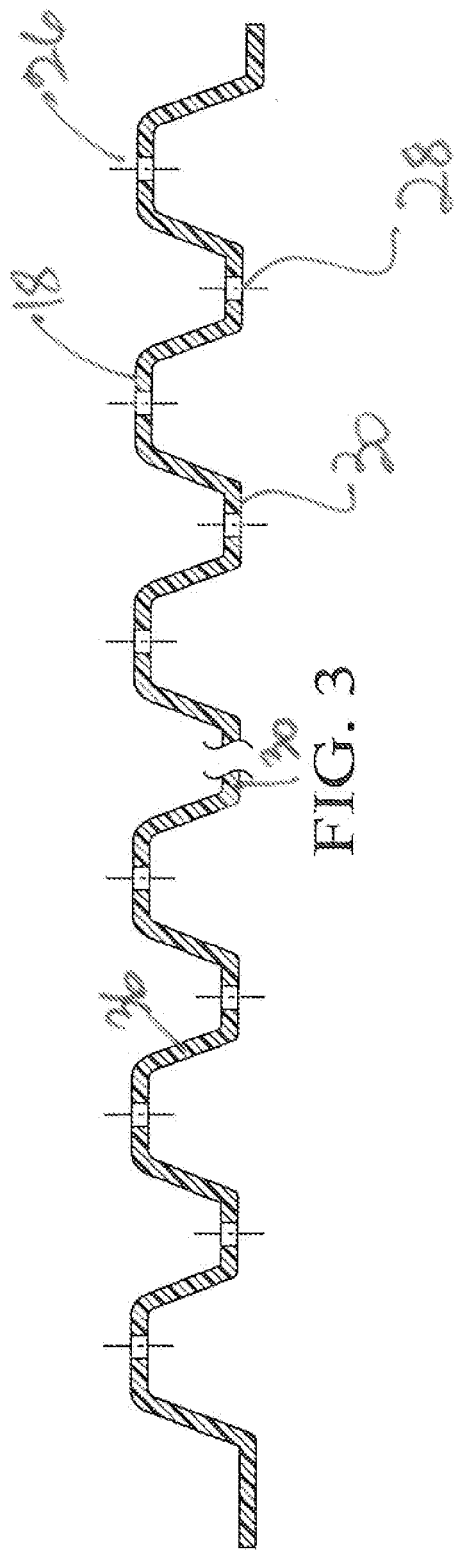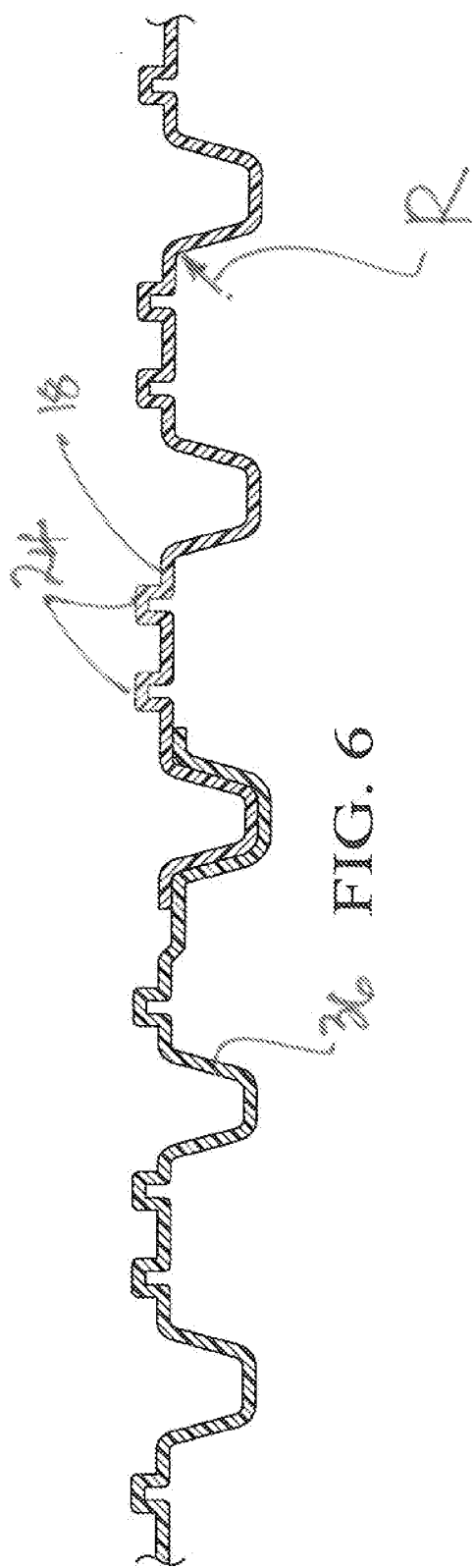

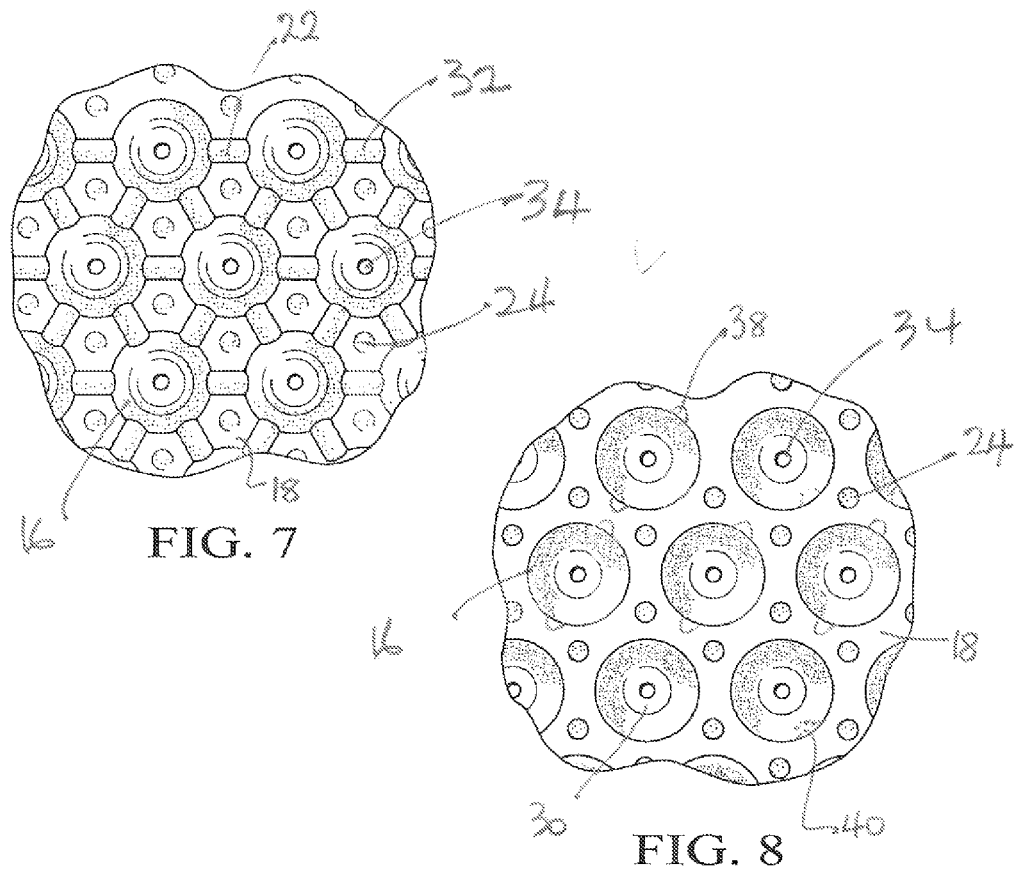
FIG. 7
FIG. 8
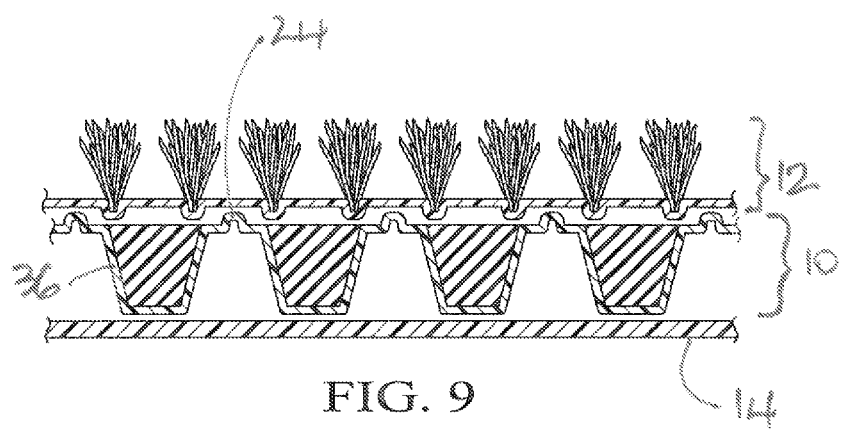
FIG. 9

SURFACE UNDERLAYMENT SYSTEM WITH INTERLOCKING RESILIENT ANTI-SLIP SHOCK TILES

TECHNICAL FIELD

Several embodiments of the invention relate to recoiling energy absorbing systems that support various impact-receiving surfaces.

BACKGROUND

It is known that energy equals force times distance. In head impact, the impact forces and impact energy translate into accelerations, both linear and rotational, that are experienced by the brain and brain stem during a hit. In an attempt to minimize these impact forces, energy absorbers are deployed between a rigid surfaces and for example a synthetic turf systems, to reduce the forces experienced by the brain and body to minimize the risk of serious injury due to contact with the turf system. While the percentage of concussions that occur due to contact with the turf vary from sport to sport, the accepted range is somewhere between 7% and 25%. While reducing the frequency of concussions due to impacts with the turf system is desired, these systems need to be deployed and function in a manner that does not increase the frequency and severity of injuries. Ideally, the turf system should perform such that it balances impact energy management and playability.

The popularity of synthetic turf systems continues to grow. The majority of new systems have fabric backed needle punched polymer fibers with an infill system that typically includes sand for ballast and elastomeric rubbers for impact energy management. Well maintained systems perform acceptably when tested with low energy flat missile tests. These flat missiles were originally developed to measure soil compaction for construction, not intended as a measure of head impact severity.

The head impact criteria (HIC) output from flat missiles measure acceleration along only one axis. They do not address non-linear events and lack bio-fidelity. These turf systems, when tested using a hemispherical head form that more closely approximates a human skull, can easily produce HIC values in excess of 1000 corresponding to a 90% probability of moderate head injury. There is clearly a need and an opportunity to improve these systems.

In recent years a secondary layer has been interposed between the turf/infill system and the compacted base. This layer is referred commonly referred to as a "shockpad" and has been historically manufactured from foam or rubber. While foam and rubber shock pads do provide some additional stroke to the system, they have proven to be relatively inefficient in their ability to absorb energy. Further such systems have various problems relative to draining and floating when exposed to a heavy rain.

The effectiveness of any energy absorbing system depends on its relative stiffness and crush efficiency over the range of impact energies the system is expected to experience. An ideal energy absorbing system would be capable of increasing or decreasing its ability to absorb energy as the speed and subsequent impact energy increases or decreases respectively. Additionally, the ideal force displacement response for linear impacts would have a relatively "square wave" shape. Idealized square wave energy absorbers ramp up quickly and maintain a relatively constant load throughout the impact event that maximizes the amount of energy capable of being absorbed. Foams and rubber absorbers ramp up slowly, lack a square wave plateau, and bottom out at less than 65% stroke.

Shockpads serve other functions in addition to absorbing energy. They need to be easy to install and, once installed, should be able to withstand the expansion and contraction that occurs as temperatures rise and fall without creating a noticeable bulge or seam on or underneath the turf surface. Shockpads also need to manage irrigation and precipitation that drains onto them through the turf/infill system. Both vertical and horizontal water management needs to be considered. Turf systems that do not drain well can create serious issues for the turf surface. The system also needs to be resilient, given that several thousand impacts could be received by the turf throughout its life cycle. Further, many foams float or have difficulty draining when exposed to heavy rain. Additionally, their long term durability and resiliency when exposed to abrasions and repeat impacts can be an issue.

The interface between the shockpad and the underside of the turf also bears consideration. High levels of slip or friction between the two has the potential of affecting the playability and safety of the turf system. Protuberances which promote some level of "bite" to the underside of the turf is to be considered. Finally, the shockpads are in a moist environment over long periods of time. Shockpad materials may be prone to hydrolysis and degrade in the presence of water and chemicals that migrate through the turf system into the underlying shockpad.

In an effort to improve the consistency of the turf systems, several shockpad systems have been developed and deployed in recent years. The three main categories of these systems include pour in-place products, rolled goods, and panels.

Pour-in-place systems are applied in a manner similar to cement or asphalt. Ground crumb rubber is combined with a thermosetting binder and then manipulated using conventional paving equipment. Once cured, these systems compliment the performance of the turf system. Historically, these systems have been prone to variation based on the installed thickness and chemical mixing of the binder and rubber. They are also more prone to breakdown due to several factors.

Rolled goods are one of the easiest materials to install. Large rolls of foam are unrolled and then either taped or stitched together to create a uniform surface. Rolls are produced from a variety of materials including ground post consumer polyurethane foam, SBR rubber, cross-linked olefin foams, and expanded polypropylene foam. These materials typically tend to have issues under the turf at the seams between rolls and can promote buckling of the turf during expansion and contraction.

Foam panels, typically made from low density EPP foam with or without formed interlocking sections have also been used. These systems react well to expansion and contraction. However their light weight and low density proves challenging during both installation when they have a tendency to "sail" in the wind, and also during heavy rainfall where the shockpads float until the water dissipates. Further a low packing density results in high transportation costs.

Floors, walls and ceilings are often subject to percussive impact. This is particularly true in sports settings in which the field and boundary wall surfaces are the recipients of impacts from players. Similarly, in military and industrial settings, blast and work mats are utilized to absorb impact forces that result from explosive events, crashes, falls and the like. These mats function to at least partially absorb these impact forces, thus cushioning the force imparted to the individual. Floorboards also receive undesirable impacts from people (or equipment) falling from an elevated distance, not only in construction areas but also in homes.

Flooring and wall structures, for example, have evolved over the years to include technology that absorbs energy transmitted during impact. For instance, synthetic and artificial turfs have been introduced into such impact-receiving surfaces as football and baseball fields in which rubber pebbles help to absorb an impact force applied thereon, reducing the risk of injury for the participants.

In recent years, excessive bodily injuries and concussions have gained more attention as diagnostic tools and methods have also evolved. Athletes and workers involved in an impact with floors or walls are susceptible to serious injury as a result of such impact. There is a desire for floors and walls in these settings to be equipped to absorb the impacting force and thereby provide better impact protection to the individuals or objects that may impact the floor and wall surfaces.

Among the references considered before filing this application are these: U.S. Pat. Nos. 8,221,856; 8,226,491; 8,568,840; U.S. patent publication Nos. 2014/0311074; 2014/0311075; EP 2154291; and WO 2013/183989A1.

SUMMARY

In one illustrative embodiment, there is an energy absorbing system of interlocking tiles or modules that coordinates with an overlying layer or turf/infill system to offer protection to heads and limbs following impact. In preferred embodiments, the energy absorbing system is injection molded or thermoformed from resilient TPU. Ether TPUs are preferred due to their inherent hydrolytic stability, chemical resistance, and durability. One preferred structure has individual energy absorbing units in at least some tiles with a base or means for coordinating the units. The base is substantially planar. In a given tile, the energy absorbing units are preferably oriented in a packed hexagonal arrangement.

The hexagonal array has been shown to have 15-25% greater energy absorbing ability compared to a rectangular array. Positioned above the means for coordinating are friction lugs which interfere with relative movement between the energy absorbing system and the overlying turf/infill system below on which the system lies. Optionally, friction lugs also extend from the energy absorbing units downwardly to a foundational layer.

In one embodiment, energy absorbing units resemble a frustoconical projection from a base. Preferably, the system is oriented such that the cone floors point toward the earth and the means of coordinating lies thereabove adjacent the overlying outer layer. In that embodiment, to inhibit slippage between the underside of the turf for example and the energy absorbing units, friction lugs are provided that extend from the base that interconnects energy absorbing units in a tile.

In several embodiments, drainage holes or cross cuts are provided in the floor of the energy absorbing units and optionally in the basal means for coordinating for vertical drainage. A void between energy absorbing units promotes horizontal drainage also. Relatedly, the permeability of the resulting structure can be tuned based on the size, shape and number of drain holes or cross-cuts.

A preferred embodiment contains interlocking engineered tiles that allow registration of one row of energy absorbing units of a given tile with an adjacent row in a neighboring tile. This arrangement inhibits lateral displacement of one tile in relation to a neighbor and accommodates expansion or contraction at both high and low temperature extremes respectively.

Each tile has a number of energy absorbing units that cooperate through a basal means for coordinating their response to impact. Energy absorbing units along a tile edge serve a dual purpose: they not only absorb energy, but also allow adjacent edges to engage each other.

One optional embodiment involves minimizing the thickness of the energy absorbing layer and filling the energy absorbing units with a ground or granulated elastomeric material (crumbs) such as tires.

Thus, the present disclosure relates generally to a recoiling energy absorbing system including resilient thermoplastic formed components manufactured by methods including thermoforming, injection molding, compression molding, and other methods from materials such as thermoplastic polyurethane (TPU), polypropylene (PP), thermoplastic polyolefin (TPO) and the like. Such materials have the characteristic of at least partial recovery to or towards an undeflected state repeatedly and non-destructively following impact. The thermoformed or injection molded components are more specifically thermoplastic tiles or modules having individually formed units for recoiling and absorbing energy applied thereto.

In one embodiment, a turf underlayment recoiling energy absorbing system has an outer layer, an intermediate energy absorbing system and a lower foundational layer. The outer layer ("impact-receiving surface") in one embodiment is a playing surface that is exposed to percussive impact. The outer layer may for example be any playing surface such as an ice rink, a hockey arena, a roller blading rink, a gymnasium floor, a basketball court, a tennis court, a wall, a racquetball or squash court, a soccer field, a football or hockey or lacrosse field, a baseball field, or ASTROTURF®. In other applications the outer layer may be a military blast mat, roofing or flooring for industrial, retail or domestic home use, various automotive applications and the like.

As used herein, the terms "upper" and "lower" are used for reference in a non-limiting manner. For example, depending on the spatial orientation of an embodiment of the recoiling energy absorbing system under consideration, such terms may be synonymous with "left" and "right" or "inclined" and similar terminology.

In more detail, at least some of the energy absorbing units associated with a given tile are provided with a flexible frustoconical curvilinear wall that extends downwardly from the means for coordinating the positioning of the energy absorbing units before, during and after impact. The energy absorbing units at least partially absorb energy generated by an impacting object by the flexible wall bending inwardly or outwardly without rupture and recoiling after impact to or towards an undeflected configuration.

In another embodiment, the energy absorbing layer includes one or more interconnected energy absorbing tiles or modules. They may be formed as long strips or polygonal (preferably quadrilateral or square) tiles.

To allow the designer to provide engineered points of weakness or weight-saving techniques, a number (X) of breaches may be defined in the wall (where $0 \leq X \leq 1000$) and/or a number (Y) apertures may be provided in a basal layer of a tile (where $0 \leq Y \leq 1000$). As used herein "breaches" includes slits or slots or combinations thereof.

The energy absorbing interlayer has a number (N) of energy absorbing units in a given tile or module that extend to a height ($H_1$) preferably about 5 mm from a basal means for coordinating that preferably lies adjacent to the outer playing surface, where $2 \leq N < 1000$. At least some of the one or more energy absorbing units are provided with a flexible wall that extends from the shell-supporting layer. A number (M) of veins are also provided that interconnect the flexible walls of at least two of the energy absorbing units, wherein $1 \leq M < 5000$. The veins have a height ($H_2$) from the means for coordinating, where $H_1 > H_2$. As noted earlier, the one or more energy absorbing units at least partially absorb energy generated by an impacting object by the flexible wall bending inwardly or outwardly without rupture and recoiling after impact to or towards an undeflected configuration.

BRIEF DESCRIPTION OF THE DRAWINGS

FIG. 3 is a cross-sectional view of the recoiling energy absorbing system along the line 3-3 of FIG. 5;

FIG. 6 is a cross-sectional view of a recoiling energy absorbing system showing friction lugs extending from the means for coordinating;

FIG. 7 is a top view of a portion of a tile or module having veins and apertures or drain holes between or within energy absorbing units in an hexagonal layout;

FIG. 8 is a is a top view of a portion of a tile or module with drain holes and ribs on some energy absorbing units in an hexagonal layout of such units;

FIG. 9 is a is a cross-sectional view of another illustrative embodiment of a recoiling energy absorbing system in which energy absorbing units are filled with a particulate or other medium interposed between a playing surface and a foundation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As will be described, an energy absorbing system 10 is provided in the present disclosure. The energy absorbing system is designed to cooperate with such impact-receiving surfaces 12 as floors, walls and ceilings so that energy transferred from an impacting object to the floors, walls and ceilings is at least partially absorbed in a non-destructible manner such that the energy absorbing system 10 is reusable following simple or repeated impacts. The absorption of energy reduces the reactive forces applied by the energy absorbing system to the impacting object, thereby reducing the risk of damage or injury to the impacting object and damage, rupture or other insult to the floors, walls and ceilings that may inhibit their ability to cushion future blows.

Figure 1:
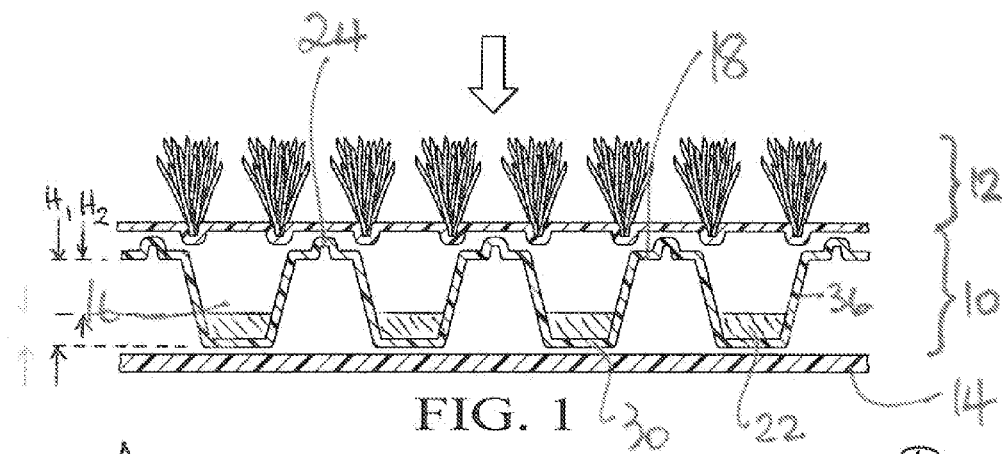
FIG. 1 is a cross-sectional view of one illustrative embodiment of a recoiling energy absorbing system that is interposed between for example a playing surface and a foundation.

FIG. 1 is a cross sectional view of a recoiling energy absorbing system 10 that is interposed between for example a playing surface 12 and a foundation 14. Lying between adjacent energy absorbing units 16 is a base or means for coordinating 18 the response of the units 16 to an impact (see arrow above the playing surface).

Figure 2:
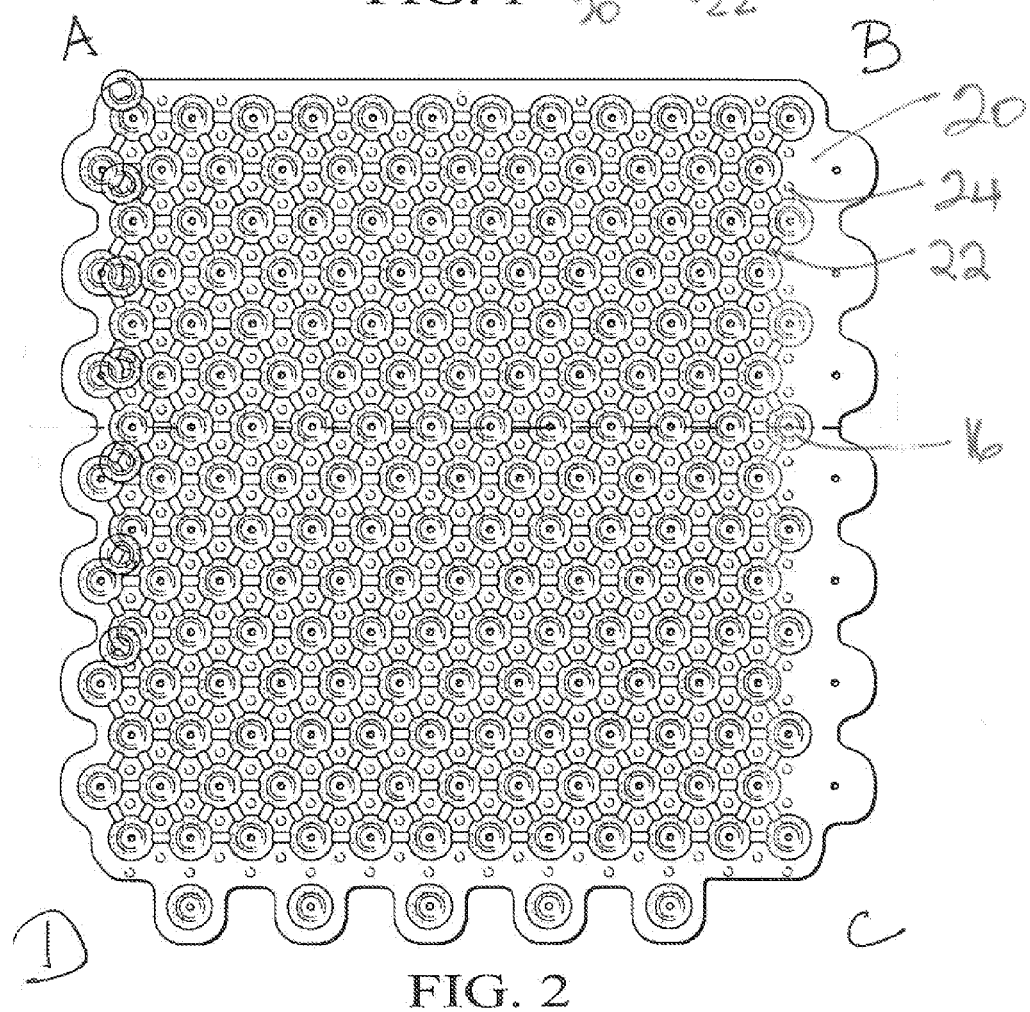
FIG. 2 is a top view of an illustrative embodiment of one tile or module of the recoiling energy absorbing system.

FIG. 2 is a top view of one individual tile or module 20. In the embodiment illustrated, there are veins 22 between adjacent energy absorbing units 16. Each such unit 16 in the embodiment shown has friction means for impeding slippage, such as friction lugs 24 that extend from the means for coordinating 18 to the overlying playing surface 12. FIG. 3 shows drain holes 26, 28 that lie in either or both of the basal means for coordinating 18 and the floor 30 of energy absorbing units. The drain holes 26 permit water to pass downwardly from the playing surface to the energy absorbing tile system below and if desired to the lowermost foundation via apertures 28.

Optionally, there are male 38 or female ribs 40 provided respectively on the outside or inside of some of the energy absorbing units 16 (FIG. 8). Friction lugs 34 (FIGS. 7, 8) with or without cross cuts are provided in the floor 30 of the energy absorbing units 16 or basal means for coordinating 18 or both. Male 38 or female 40 or a combination of male and female ribs typically run parallel to a vertical axis of the associated energy absorbing unit 16. Experiments have shown that such ribs can increase or decrease the initial yield point of these structures. This may be desirable for stiffening the entire energy absorbing module 20 or weakening individual interlocking cones 16. The lugs 24 provide a gripping or compliant cushioning interface with the foundational layer 14 below. The cross cuts permit seepage or drainage if needed.

FIG. 2 is a top view of a tile 20 in which veins 22 are provided between energy absorbing units 16 to shore them up so they may support each other in response to impact.

FIG. 2 also shows energy absorbing units that lie along edges of a tile 20. Not only do they assist in energy absorption, but they perform a registration function. The embodiment shown has interlocking frustoconical projections 16 along adjacent edges of the tile 20. Traction or friction lugs 24 are provided in the energy absorbing units 16, the basal means for coordinating 18, or both. The lugs 24 preferably extend from a face of the basal means for coordinating 18 in a direction that is opposite from that from which the energy absorbing units 16 extend. In the hexagonal arrangement shown up to six veins 22 may extend from a given unit 16.

Figure 4:
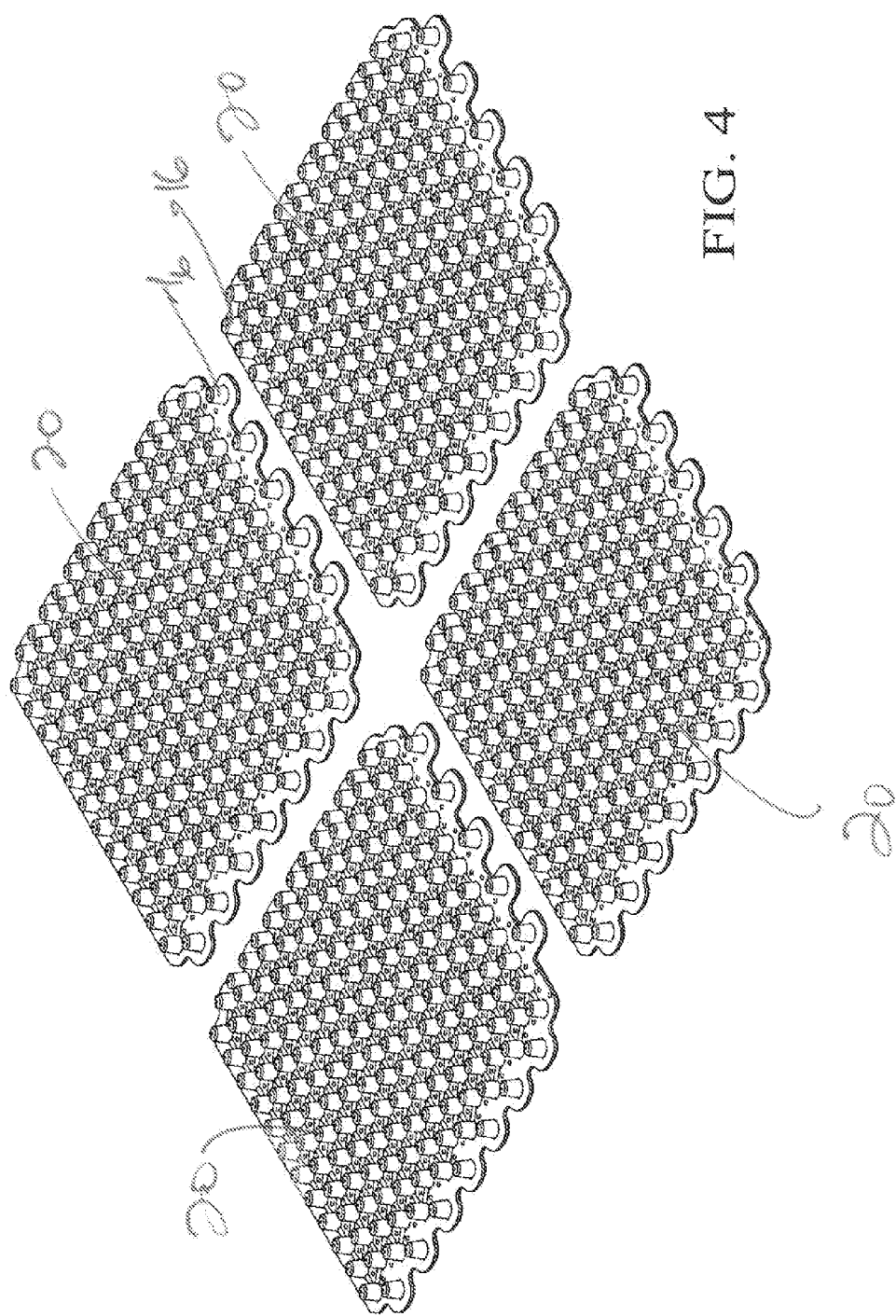
FIG. 4 is a perspective exploded view of four representative tiles or modules before they are juxtaposed in an interlocking relationship.
Figure 5:
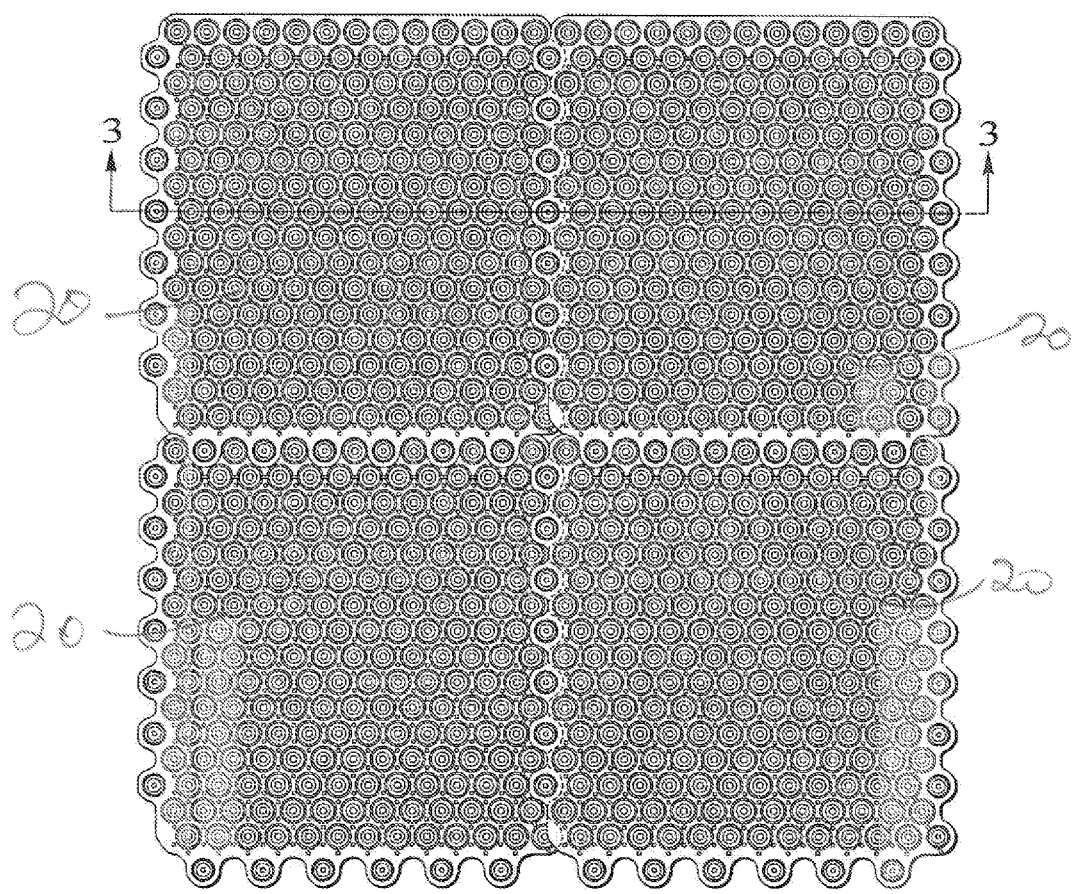
FIG. 5 is a top view of four tiles after being placed in an interlocking relationship.

FIG. 4 depicts one exemplary arrangement of interlocking tiles or modules before they are moved into an interlocking engagement. FIG. 5 depicts one arrangement in which four tiles 20 for example are interlocked. Additionally, the means for interlocking the modules may be selected from groups including a tongue and groove arrangement, push pins, adhesive bonding, stitching, and the like.

For reference, consider the tile or module shown in FIG. 2. Imagine that the tile has four edges A-B, B-C, C-D and D-A. In the example illustrated, the edge A-B is straight and is oriented in an east-west position at the north edge of the tile. Each of the other tiles in the assembly are similarly oriented (FIG. 5). Thus the A-B edge of tile #1 interlocks with the C-D edge of the adjacent tile; the B-C edge of tile #1 interlocks with the D-A edge of its neighbor; the C-D edge of tile #1 interlocks with the A-B edge of its neighbor; and the D-A edge of tile #1 interlocks with the B-C edge of its neighbor.

FIG. 6 is an enlargement of an interlocking area with for example two friction lugs 24 extending from a basal means for coordinating 18.

FIG. 5 is a top plan view of four interlocked panels 20. At their common boundaries, the frustoconical units 16 play a dual role: not only do they absorb energy, but they interlock adjacent edges of neighboring panels 20. It can reasonably be expected that energy absorption characteristics along the edges may be stiffer than in intermediate regions of a given tile 20. But if this characteristic is not desired, the tile edges can be made thinner or otherwise weakened.

The energy absorbing characteristics of the disclosed arrangement can be tuned with fill material (e.g., crumb rubber), the grade of ether TPU material, the base thickness of the thermoformed or injection-molded sheet, and the frustoconical height, shape and spacing of adjacent units to optimize the system level performance in combination with the turf/infill system (FIG. 9).

As shown in the test results described below, among the advantages of the disclosed energy absorbing system are:

a. Thermoforming offers easy performance tuning by changing the base sheet thickness and material that one thermoforms over the tool;

b. The material of construction is durable, resilient, hydrolytically stable and chemical-resistant;

c. The energy absorbing capability is superior to that of the known prior art;

d. The absorber has superior drainage capabilities compared to other products;

e. The interlocking mechanism is easy to install and accommodates thermal expansion and contraction;

f. Thermoforming lends itself to rapid high volume manufacturing and low manufacturing costs;

g. The absorber has the ability to retain water, if desired, as either a temporary reservoir of effluent or to retain water for evaporative cooling;

h. The system is light in weight and low in cost, as discussed in more detail below;

i. The system has superior horizontal drainage;

j. The high packing density of the system allows for cost-effective shipping to a job site and minimizes storage and warehouse space required to stage material before installation;

k. The system exhibits superior impact performance compared to the competition. This is shown by an observed lower HIC, lower GMAX, and lower Clegg. However the overlying surface is still playable.

for a Community Field and 4 mm to 10 mm for Stadium Field. Vertical Deformation typically will reduce over time as a field receives use.

Energy Restitution (Advanced Artificial Athlete)

Energy Restitution is defined as the energy returned as a percentage of the energy of applied. This can be thought of as the springiness of the surface. This value relates to the feel underfoot as well as the speed of play. Although this measurement is not a part of the official standard, it is a useful measure. The recommended range is 20% to 50%.

ASTM F355A Gmax Impact Attenuation (Flat Faced Drop Missile)

The ASTM F355A Impact Hardness is the official device/method for assessing the hardness of synthetic turf athletic fields. It is used to gauge impact attenuation based on a predetermined head/body impact. This is a 20 lb. "missile" with a tri-axial accelerometer dropped from a height of 24 in. The STC recommends that the Gmax values be less than 165.

EN 1177-HIC Impact Attenuation (Hemispherical Drop Missile)

The EN 1177-Impact attenuating play surfacing determination of critical fall height method is similar to the method commonly used for assessing playground surfacing in the United States. Internationally it is the primary method for both synthetic turf and playground surfacing. This device calculates the Head Injury Criteria (HIC). This is used to gauge the probability of head injury potential resulting from a surface impact. This device is a hemispherical 10 lb "missile" with a tri-axial accelerometer. The hemisphere is dropped from (4) different heights to determine the height at which the HIC would be 1000. This height is referred to as the critical fall height. It is recommended that the critical fall height values be less than 1.3 meters.

Clegg "Game-Day" Impact Hardness

Clegg impact hardness testing is recommended by the NLF to assess "game-day" impact hardness of the playing surface.

| Results Table System ID | Force Reduction (%) | Vertical Def (mm) | Energy Restit (%) | 355A "Flat" Gmax | 355A "Flat" HIC | Critical Fall Height (m) | Clegg Units |
|---|---|---|---|---|---|---|---|
| Turf Only-40S/60R | 64 | 9.7 | 33 | 109 | 289 | 1.26 | 59 |
| Turf Only-60S/40R | 63 | 8.2 | 32 | 135 | 409 | 1.18 | 71 |
| T-14-EPP-40S/60R | 67 | 10.9 | 32 | 84 | 189 | 1.84 | 57 |
| T-14-EPP-60S/40R | 65 | 9.5 | 34 | 88 | 218 | 1.59 | 64 |
| T-40S/60R-ET218-0.035 | 73 | 10.6 | 27 | 51 | 109 | 2.33 | 54 |
| T-60S/40R-ET218-0.035 | 74 | 11.6 | 23 | 60 | 137 | 2.34 | 57 |

As used herein, here is what the above terms mean:

Force Reduction (Advanced Artificial Athlete)

Force Reduction measures the impact absorption provided by surface to a player under foot as they run. A lower value describes a surface that is harder underfoot. The results are compared to the STC performance guidelines of 55% to 70% for a Community Field and 60% to 70% for Stadium Field.

Vertical Deformation (Advanced Artificial Athlete)

Vertical Deformation measures the amount a surface compresses as an athlete runs across it. This value is often related to speed of play and surface stability. The results are compared to the STC performance guidelines of 4 mm to 11 mm A 2.25 kg Clegg impact tester was used per ASTM F1702. This is a 5 lb "missile" with a uni-axial accelerometer dropped from a height of 18 in. The NFL recommends that the Clegg result be less than 100.

Additionally, testing has indicated that a large fillet radius (R) between the cone wall 36 and the means for coordinating 18 has a positive effect on vertical deformation (FIG. 6). The larger radius is thought to change the buckling mechanism such that the initial yield force is greater than a similar structure with a reduced radius. Lower vertical deformation is desirable as it creates a surface that feels "fast" as opposed to one that is "spongey". The increase in the initial yield point allows the system to be tuned such that it plays fast but the cones 16 still buckle and collapse in response to a substantial impact force which exceeds the yield point.

In more detail, referring back to FIG. 1, an energy absorbing system 10 is shown according to one embodiment of the present disclosure. The system 10 includes an outer shell (a playing surface, for example) or upper impact surface 12 that is exposed to single or repeated percussive impacts. As noted earlier, the upper impact surface 12 may for example be in the form of a playing surface such as, an ice rink, a hockey arena, a roller blading rink, a gymnasium floor, a basketball court, a tennis court, a wall, a racquetball or squash court, a soccer field, a football or hockey or lacrosse field, a baseball field, ASTROTURF®. The surface 12 is also exemplified by a blast mat flooring for military and industrial, retail or domestic home use, various automotive applications and the like. In sum, the upper impact surface 12 may be any surface in which it is desirable to provide for recoiling, non-destructive reusable energy absorption following percussive impact.

A lower reaction surface (or foundation) 14 is provided below the upper impact surface 12. The lower reaction surface 14 acts as a structural sub-floor and generally takes the same general shape as the upper impact surface 12, i.e., flat, curved, undulating, or curvilinear.

Between the upper impact surface 12 and the lower reaction surface 14, the energy absorbing system 10 in one embodiment may be made from a thermoformed plastic material, such as that available under the product name SAFETY PLASTIC® from The Oakwood Group, Dearborn, Mich. While references herein are made to the material being thermoformed, it should be understood that the term "thermoformed" is not be construed to be limiting. Other manufacturing methods are contemplated, and thermoforming is but one example. Other ways to make the absorber can include injection molding, compression molding, plastics extrusion, etc. The energy absorbing system 16 may be thermoformed or otherwise molded into its desired shape.

Each individual energy absorbing unit 16 includes one or more sidewalls 36 extending from the basal means for coordinating 18. The sidewalls 36 can be thought of as "curvilinear". Viewed from the side, they appear substantially straight before impact. Viewed from above or below, they appear circular, oblong, elliptical or shaped like a race-track. Some of the sidewalls 36 are provided with slits or slots (not shown) that extend at least partially between a floor 30 and the basal means for coordinating 18. A number (X) of such breaches may be formed in an intermediate section of a wall or extend from its lower to its upper perimeter. The sidewalls 36 extend towards the upper impact surface 12 from the means for coordinating 18 to the floor 30. The surface 18 may also be referred to as a shell-supporting layer, due to its supporting the upper impact surface 12 from below. Consequently, the upper surface 18 may be substantially flat to support the underside of the upper impact surface 12.

The sidewalls 36 are shown to be extending inwardly from the basal layer 18. It should be understood that the sidewalls 22 can also extend outwardly from the basal layer 18 or the sidewalls 22 can extend substantially perpendicular to the basal layer 18.

Groupings of the energy absorbing units (a number (N) per tile) 16 may form various energy absorbing tiles or modules 20. The modules 20 can be connected or interlocked such that a plurality of modules 20 can be utilized to take any desired shape. This enables the modules 20 to cooperate so that an energy absorbing system may be efficiently installed within spatial constraints imposed by an environment of use. The modules 20 may also be interconnected via male-and-female meshing connectors, a tongue and groove arrangement, or other such connectors. This enables an unlimited number of modules 20 to couple to one another to create relatively large groupings of modules suited for large applications, for example, beneath a football field or basketball court.

As noted earlier, the energy absorbing layer 10 and each of the energy absorbing units 16 may be made of a resilient thermoplastic formed component such as TPU, PP, or PU. Such materials provide strength to support the upper impact surface 12, yet offer relative resiliency compared to that of the upper impact surface 12.

Upon the system 10 receiving a force from an impacting object, for example on the upper impact surface 12, the relative resiliency of the layer 10 enables the sidewalls 36 to bend inwardly (or outwardly) non-destructively in response to the impacting force. Few or no cracks or microcracks are engendered by the blow. The sidewalls 36 bend to a deflected configuration without rupture while receiving the impact force. This bending causes the upper layer 18 to compress towards the floor 30 of a unit 16. Subsequently, the sidewalls 36 recoil upon the completion of the impact force, causing the sidewalls 36 to substantially revert to an undeflected configuration and thereby allowing the upper layer 18 to decompress away from the floor 30. The bending and recoiling of the sidewalls 36 thus enable the energy absorbing units 16 to absorb the impact energy, thereby reducing the risk of damage sustained by either or both of the impacting object or the impact surface 12.

To allow the designer to provide engineered points of weakness or weight-saving techniques, a number (X) of breaches may be defined in the wall (where $0 \leq X \leq 1000$) and/or a number (Y) apertures may be provided in the basal means for coordinating or basal layer 18 (where $0 \leq Y \leq 1000$) or in the floor 30.

It should be understood that the energy absorbing units 16 may also include accordion-shaped bevels such that portions of the sidewalls 36 stack on top of one another during the compression, and extend back to their normal arrangement after impact. Other configurations are contemplated in which the sidewalls bend, deflect, or otherwise move in order to enable the upper layer 18 to compress towards the floor 30 such that the energy absorbing units 16 can absorb at least part of the impact force. The sidewalls 36 may also be formed of such material and strength as to only bend and deflect upon receiving a force above a predetermined threshold.

Referring still to FIG. 1, artificial field turf 30 such as ASTROTURF® is provided above the upper impact surface 12. The turf may include artificial grass as well as rubber particulates buried within the grass. This particular embodiment may be suitable for football, baseball, soccer, track and field, tennis, field hockey, and other sports in which artificial field turf is utilized. Upon receiving an impact force, the turf absorbs a portion of the impact energy and transfers the remaining force to the upper impact surface 12. If the force is beyond a yield strength threshold, the sidewalls 36 of the energy absorbing units 16 are caused to deflect as previously discussed such that the energy is absorbed by the units 16.

Turning to FIG. 3, an embodiment of a drainage system 28 is illustrated. Apertures 26-28, are provided in either or both the layer 18 and the floor 30. The apertures 26 allow moisture and liquids to pass through the layer 18 so that the moisture and liquids can be irrigated via drains away from the energy absorption system 10. The surfaces of layer 18 and the floor 30 may slightly slope towards the apertures 28 to guide the liquid to flow through the apertures and into the drains. If desired the layer 28 or floor 30 may also be semi permeable to allow effluent drainage into an engineered subsurface drain system.

Referring to FIGS. 7 and 8, an alternative embodiment is illustrated in which energy absorbing units 16 are arranged in a grid pattern. It should be understood that while a grid is illustrated in this Figure, the units 16 need not be arraigned in a grid nor arranged uniformly.

A plurality (M) of veins 22 (FIG. 1) may optionally interconnect the energy absorbing units 16 (see also, FIGS. 2 & 7. The veins 22 are formed along with the units 16. The veins 32 provide rigidity to the energy absorbing system yet are flexible to help absorb and transfer energy received from an impacting object. The veins 22 also coordinate and facilitate the distribution of the transfer of energy between the units 16. For example, if an impacting object impacts a region near one energy absorbing unit 16, when that unit 16 compresses to absorb the force, the force is also transmitted laterally from one unit 16 to another via the interconnecting veins 22. This may be beneficial in very high impact regions in which a distribution of force throughout the units 16 is necessary. For instance, this embodiment may be particularly useful in floors, walls and ceilings of military vehicles including helicopters and tanks and the like in which large impacting forces from projectiles are exerted on the outer shells of the vehicle.

Each vein 22 connects at least one energy absorbing unit 16. The energy absorbing unit 16 has an overall height $H_1$ (FIG. 1) and the veins 22 have a height $H_2$. It should be understood that $H_2$ can be between 0 and $H_1$ in various embodiments. For example, if no veins 22 are desired, then the height $H_2$ may be equal to 0. Furthermore, a number M of veins 32 may be provided that correspond to a number N of energy absorbing units 16 in a given tile 20. In some embodiments, M>N. However, other embodiments are contemplated in which M<N (for example, two energy absorbing units 16 interconnected by one vein 22). It should be understood that N can be between 2 and 1,000 or greater, for any particular embodiment.

The upper impact surface 12 may be in the form of a ceiling or the inner surface of a military vehicle, for example, and the entire energy absorbing assembly 10 may be placed within the military vehicle.

The foundation or lower reaction surface 14 may be in the form of an exterior surface of a military vehicle. When an impacting object (such as a boot, a weapon, a piece of armor, or other objects within the vehicle) impacts the upper impact surface 12, the veins 22 distribute the force at least laterally to nearby energy absorbing units 16. This inhibits the force from rupturing or destroying the energy absorbing layer 10 and injuring an occupant within the military vehicle.

It should be understood that the embodiments illustrated can be intermixed with other embodiments. For example, the energy absorbing system 10 may or may not be provided with veins 22 or friction lugs 24 or drain holes 26, 28.

It is desirable to minimize the amount of material used in forming each module to reduce system weight and cost. Typically, as the hardness increases, less raw material is necessary to absorb the impact energy but often at the expense of recoverability. The prior art described in WO 2013/183989 describes structures comprised of EPDM rubber of thermoplastic elastomers whose hardness ranges from 30 to 70 Shore A and mass of 2 kg to 5 kg per square meter. In contrast, the preferred embodiment of the disclosed invention utilizes thermoplastic polyurethanes (TPU's) in hardness range of 45-65 Shore D which is substantially stiffer than that described in the prior art. Furthermore, the performance of the claimed invention is optimized between 1.0 kg and 1.9 kg per square meter. The thinner walls of the energy absorbing modules have superior crush efficiency compared to the protuberances described in the prior art. In summary, the performance, mass, energy absorbing mechanism, and cost per square meter of the claimed invention distinguished itself from the prior art.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recoiling energy absorbing system configured to be interposed between on the one hand an outer layer that is exposed to impact, the outer layer being selected from the group consisting of floors, roofs, walls or ceilings in a playing surface, a hockey arena, a roller blading rink, a gymnasium, a basketball court, a tennis court, a wall, a racquetball or squash court, a soccer field, a football or hockey or lacrosse field, a baseball field, synthetic turf, ASTROTURF®, a military blast mat, flooring for industrial, retail or domestic home use, an automotive application, and the like and on the other hand a foundation, the recoiling energy absorbing system having:
   interlocking energy absorbing modules, at least some of the modules being provided with:
      edges, at least some of the edges having means for interlocking with an edge of an adjacent module, the means for interlocking including energy absorbing units being received by energy absorbing units disposed along an edge of an adjacent module;
      the one or more energy absorbing units being hexagonally arranged and extending from means for coordinating energy absorbing units having a face that is juxtaposed with the outer layer, at least some of the one or more energy absorbing units having:
         a frustoconical flexible wall that extends from the face of the means for coordinating away from the outer layer, the frustoconical wall when viewed from above or below having the shape selected from the group consisting of circular, oblong, elliptical or race track;
         a floor extending between the flexible walls of adjacent energy absorbing units and configured to be positioned adjacent the foundation;
         the one or more energy absorbing units at least partially absorbing energy generated by an impacting object by the flexible wall bending inwardly or outwardly and recoiling after impact to or towards an undeflected configuration; and
         a mechanical friction means for impeding slippage extending downwardly from a floor between at least some energy absorbing units toward the foundation or upwardly from a face of the means for coordinating towards the outer layer.

2. The recoiling energy absorbing system of claim 1, wherein the mechanical friction means includes a lug that extends downwardly from the floor of at least some energy absorbing units toward the foundation, and another lug that extends upwardly from the face of the means for coordinating towards the outer layer.

3. The recoiling energy absorbing system of claim 1, wherein one or more of the energy absorbing modules is provided with one or more apertures that serve as drain holes in the face of the means for coordinating, in the floor between energy absorbing units or in both the face and the floor.

4. The recoiling energy absorbing system of claim 3, wherein the plurality of apertures (Y) per module is such that $0 \leq Y \leq 5000$.

5. The recoiling energy absorbing system of claim 3, wherein at least one flexible wall has a number (X) of breaches therewithin, where $0 \leq X \leq 1000$, the breaches being formed in an intermediate section of a wall or extend from its lower to its upper perimeter.

6. The recoiling energy absorbing system of claim 1, wherein the means for coordinating lies between energy absorbing units and supports the outer layer, the walls of the energy absorbing units extending away from the outer layer and towards the underlying foundation, the friction means impeding relative motion between the interlocking energy absorbing modules and the outer layer and the foundation.

7. The recoiling energy absorbing system of claim 1, further including a number (M) of veins that interconnect the flexible walls of at least two of the energy absorbing units, where $1 \leq M \leq 5000$, the veins having a height ($H_2$), wherein $H_1 > H_2$; and wherein the veins provide structural support to at least one of the flexible walls and coordinate the cushioning of the energy generated by the impacting object throughout a plurality of the energy absorbing units.

8. The recoiling energy absorbing system of claim 7, wherein the energy absorbing units and the veins are interconnected in a grid to facilitate the cushioning of the energy generated by the impacting object throughout the plurality of energy absorbing units.

9. The recoiling energy absorbing system of claim 8, wherein a plurality of the veins extend from the wall of one of the energy absorbing units.

10. The recoiling energy absorbing system of claim 7, further including friction means extending from the floor towards the foundation or from the face of the means for coordinating to the outer layer or both from the floor and the face.

11. The recoiling energy absorbing system of claim 1, wherein the number of edges in a module is 4.

12. The recoiling energy absorbing system of claim 1, wherein the number of edges in a module is >3.

13. The recoiling energy absorbing system of claim 1, further including a rib provided in a flexible wall.

14. The recoiling energy absorbing system of claim 13, wherein the rib is a male rib.

15. The recoiling energy absorbing system of claim 13, wherein the rib is a female rib.

16. The recoiling energy absorbing system of claim 1, further including:
   an outer layer that is exposed to impact, and
   a foundation, wherein the interlocking energy absorbing modules are interposed between the outer layer and the foundation.

* * * * *